July 10, 1951      L. M. E. CLAUSING      2,560,085
FLUOROGRAPHY
Filed Feb. 6, 1947      2 Sheets-Sheet 1
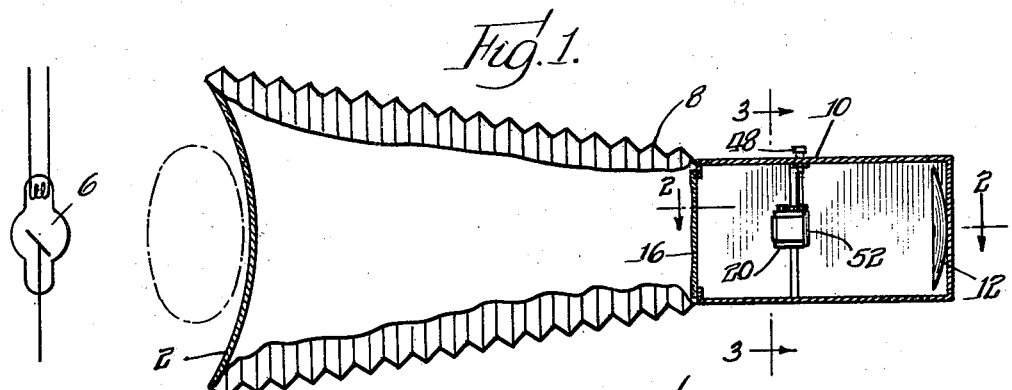
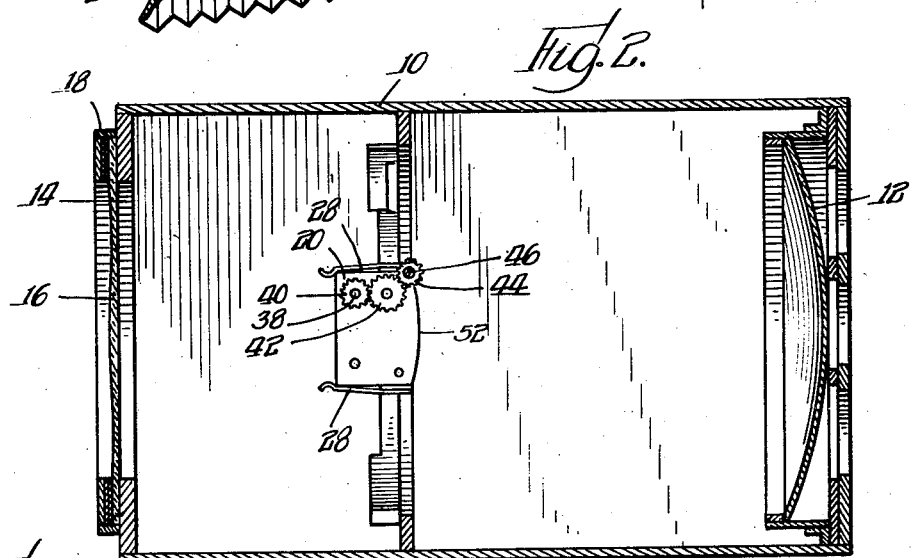
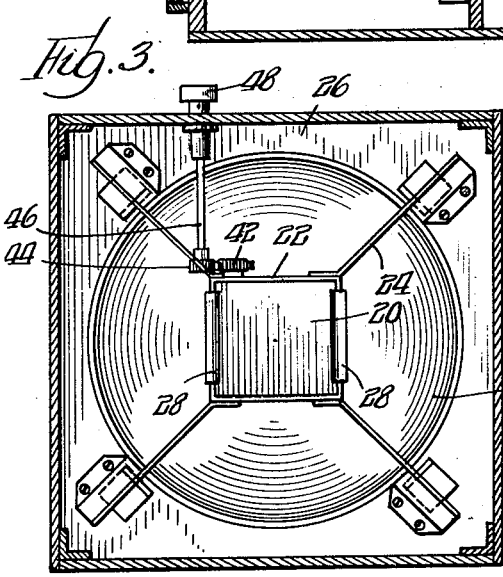
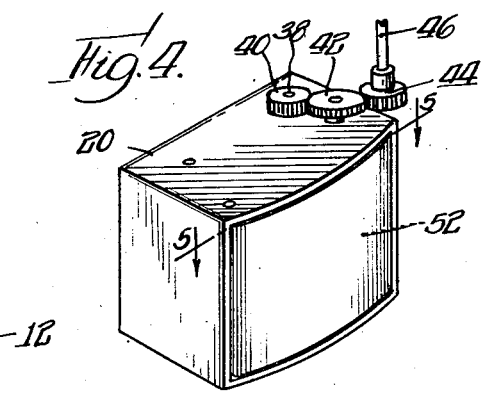
INVENTOR.
Leroy M. E. Clausing
By: Moore, Olson & Trexler
attys

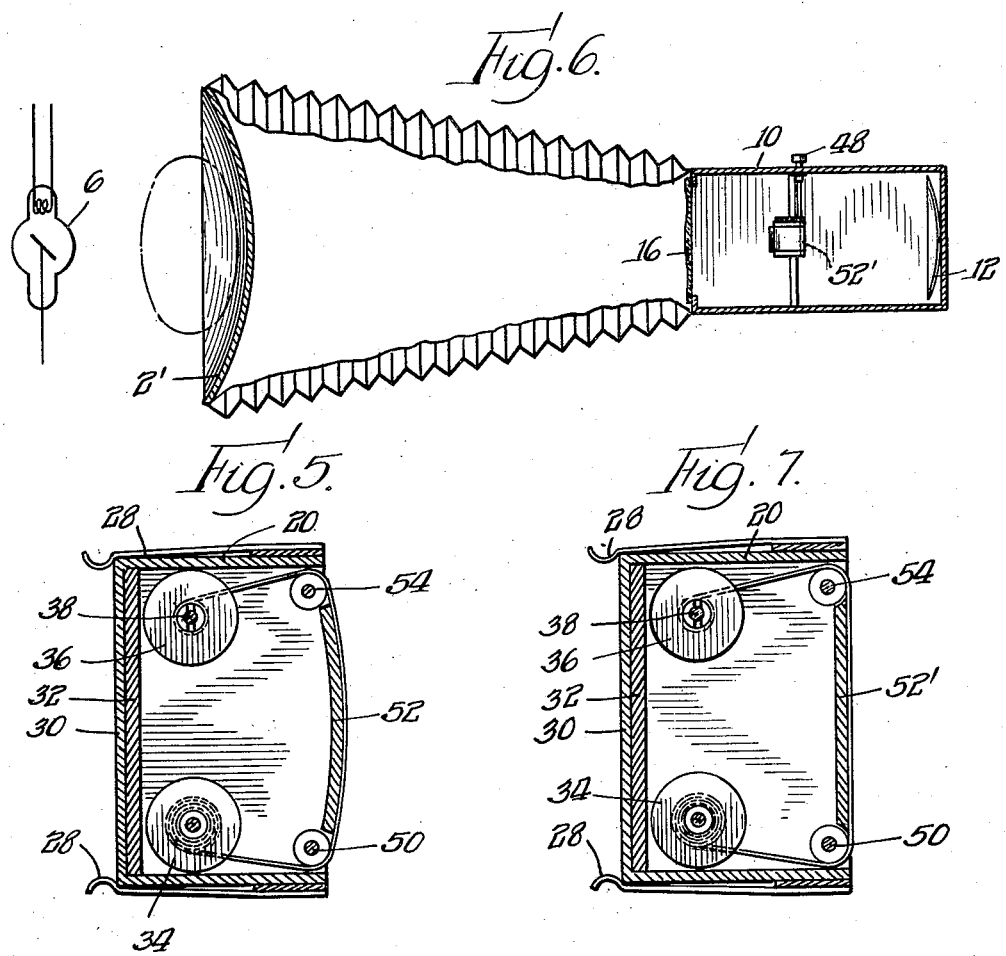

Patented July 10, 1951

2,560,085

UNITED STATES PATENT OFFICE 2,560,085

FLUOROGRAPHY

Leroy M. E. Clausing, Chicago, Ill.

Application February 6, 1947, Serial No. 726,874

8 Claims. (Cl. 250—65)

This invention relates to the making of fluorograms and more particularly to fluorographic equipment therefor.

Fluorograms made according to present methods and with known equipment are not entirely satisfactory because of the difficulty of securing sufficient density of the image on the film with the present type high speed lens. It is an important object of the invention to provide means for overcoming these difficulties in making fluorograms.

Another object of this invention is to provide means for making fluorograms on roll film by means of a camera of the spherical mirror type.

The normal lens-mirror optical system requires an image surface which is in the form of a portion of a sphere and it is, therefore, the custom either to provide a film support of this shape and to bend the film or plate to the shape of the support and to hold it in place by means of a collar or a film clamping device in order to make the film surface conform to the image surface, or, to use a field-flattening lens and a flat film support. The first is not only inconvenient but undesirable because it prevents the use of a continuous film strip and the taking of successive pictures on a roll of film or a continuous film strip and the second is undesirable because of the loss of light by reflection on the surfaces of the field-flattening lens and because that lens being very close to the focal surface unavoidable dust and other foreign matter on the lens will show prominently on the fluorogram. It is, therefore, a further important object of the invention to provide means for taking fluorograms upon a continuous film strip or roll of film.

Other and further objects will be apparent from the following description when taken in connection with the accompanying drawings, wherein:

Fig. 1 is a plan view of an apparatus embodying the invention;

Fig. 2 is an enlarged view in vertical section taken substantially along the line 2—2 of Fig. 1;

Fig. 3 is a view in vertical section taken substantially along the line 3—3 of Fig. 1;

Fig. 4 is a view in perspective of a film box forming a part of the invention;

Fig. 5 is a view in horizontal section taken substantially along the line 5—5 of Fig. 4;

Fig. 6 is a plan view similar to Fig. 1 showing another form of apparatus embodying the invention; and Fig. 7 is a view in vertical section taken substantially along the line 7—7 of Fig. 6.

As shown in Figs. 1 to 6, the photographic equipment or camera for making fluorograms comprises a fluorescent screen 2 upon which a fluorescent image is formed of the object 4 by means of X-rays from the X-ray source or tube 6. The screen is positioned at the outer end of a light-tight box or housing 8 joined at its inner end to a housing 10. At the rear end of the housing 10 there is mounted, in any convenient manner, a spherical mirror 12 axially aligned with an opening 14 in the forward end of the box 10 and with an aplanatic or aspherical, correcting plate lens 16 mounted in a lens holder 18 fastened to the box 10 in any convenient manner.

A film box 20 is detachably mounted in a frame 22 supported by diagonal arms 24 fixed at their outer ends to an apertured partition 26. The film box 20 is detachably held in the frame 22 by means of opposed spring-plate latches 28. The film box 20 is open at its front end, facing the mirror 12, and is closed at its back end, facing the lens 16. In the back end 30 of the box there is mounted an X-ray opaque plate 32, preferably of lead, for excluding the direct X-rays from the box.

Within the box 20 is mounted, in a conventional manner, means detachably to receive a film supply roll 34 and a take-up reel 36, which latter, in the conventional manner, is rotated by means of a shaft 38 to which it is detachably interlocked. The shaft 38 is provided, externally of the box, with a gear 40 meshing with a gear 42, in turn meshing with a gear 44 mounted on the lower end of a vertical shaft 46 projecting through the upper wall of the housing 10 and provided with a suitable operating knob or wheel 48. From the supply roll 34 the film passes first over a vertical guide roll 50, then over a film supporting backing plate 52 and over a second guide roller 54 to the take-up reel 36.

Heretofore in taking pictures with this type of camera, i. e., one including a spherical mirror which focuses the received rays on the film surface, it has been thought necessary to provide a film supporting surface of spherical form and of a definite radius relation to the spherical mirror. It has, therefore, been necessary to bend the film or plate to the shape of this spherical backing plate in order to get images of sufficient definiteness for practical purposes. This has prevented the use of a camera in taking pictures upon a continuous strip where portions of the strip are exposed successively.

I have discovered that this limitation of the use of the camera may be avoided in the making of X-ray fluorograms by forming the fluorescent screen 2 in the shape of a portion of a cylindrical surface and forming the film backing plate 52 also in the shape of a cylindrical surface whose center of revolution or axis is perpendicular to the center of revolution or axis of the cylindrical surface of the fluorescent screen 2. With the screen and film backing plate thus formed as cylinders whose axes are perpendicular to each other and with the object positioned against the concave side of the fluorescent screen 2, the image formed on the film by reflection from the spherical mirror 12 is sharp except at the very edge of the four corners of the film surface, which usually does not receive any portion of the image anyway, so that the indefiniteness at these corners is of no particular concern. Since the objects of which a fluorogram is desired are some part or parts of the human body which are convex in shape, the concave-convex fluorescent screen provides a very conveniently shaped surface for application to such parts. It should be noted also that this concave-convex fluorescent screen provides a marked improvement in definiteness in the fluorescent image on the screen for it conforms more properly to the contour of the part to be fluorographed, it makes the distance between the object and screen more uniform, and it conforms more nearly to the diverging rays from the X-ray target.

I have further discovered that in instances where the shape of the object permits, the fluorescent screen 2' may be formed in the shape of a portion of a sphere with the radius of the fluorescent image surface of such value that with the particular lens-mirror system, the focal axis of which passes through the center of the sphere, the film image will be formed upon a plane surface at the focus of the spherical mirror, so that the film backing plate 52 may be a flat plate or any other shape of plate having a plane surface, against which the film is moved and on which it rests while exposed. In many cases, such a screen will conform closely to the shape of the object or part of the human body which is to be fluorographed and will present a surface of nearly equal radius to the diverging X-ray beams.

This invention also eliminates the lead glass shield normally used to protect the film from exposure to X-rays and shields the film from direct exposure to X-rays by use of the plate 32 of metallic lead or other X-ray opaque material positioned at the back surface of the film. More efficient protection against high intensity X-rays can therefore more readily be secured.

It will, therefore, be evident that I have provided means for making fluorograms by means of a camera of the spherical mirror type which overcomes the difficulties formerly encountered in making fluorograms, and which makes it possible and practicable to take fluorograms upon a continuous film strip or roll of film.

It is obvious that numerous changes may be made in the form, construction and arrangement of the device without departing from the spirit or scope of the invention or sacrificing any of its attendant advantages, the form herein described being a preferred embodiment for the purpose of illustrating the invention.

I claim:

1. Means for taking X-ray pictures comprising a fluorescent screen, a mirror-correcting plate lens system, film support means, said film support means and said system being so positioned relative to each other and to said screen that the fluorescent image on said screen is reproduced on a film in an area which is positioned against said support means, said film support means having a cylindrical surface and said fluorescent screen having an image surface cylindrical about an axis of revolution perpendicular to the axis of revolution of the film supporting surface.

2. Means for taking X-ray pictures comprising a fluorescent screen, an aspherical lens and spherical mirror system, film support means, said film support means and said lens-mirror system being so positioned relative to each other and to said screen that the fluorescent image on said screen is reproduced on a film positioned against said support means, said film support means having a plane surface against which the image receiving portion of the film rests and said fluorescent screen being formed as a portion of a sphere convex toward said lens-mirror system.

3. Means for taking X-ray pictures comprising a fluorescent screen, an aspherical lens and spherical mirror system, a film support for receiving and supporting the film, said film support having a film engaging surface which is flat in one direction of cross section, and said fluorescent screen in the same direction of cross section being of curvilineal shape such that the lens-mirror system focuses the fluorescent image upon said film engaging surface of the support, said fluorescent screen being convex toward said lens-mirror system.

4. Means for taking X-ray pictures comprising a fluorescent screen, an aspherical lens and spherical mirror system, a film support, said film support and said lens-mirror system being so positioned relative to each other and to said screen that the fluorescent image on said screen is reproduced as a film image at the surface of said support, said support having a film engaging surface which is flat in one direction of cross section, and said fluorescent screen being of concave-convex configuration with its convex surface facing the lens-mirror system.

5. Means for taking a series of X-ray pictures upon a film strip, said means comprising a fluorescent screen, an aspherical lens and spherical mirror system, a film support positioned at the focal plane of said system, means for feeding a film strip in successive increments across said support, said film support having a part cylindrical film engaging surface and said fluorescent screen being part cylindrical with its axis of revolution perpendicular to the axis of revolution of the film engaging surface of the support to give a photographic image sharp on both of said axes.

6. Means for taking a series of X-ray pictures upon a film strip, said means comprising a fluorescent screen, an aspherical lens and spherical mirror system, a film support positioned at the focal plane of said system, means for feeding a film strip in successive increments across said support, said film support having a plane film engaging surface and said fluorescent screen being formed as a portion of a substantially true sphere whose center lies on a prolongation of the focal axis of the lens-mirror system and against the concave side of which an object to be X-rayed is positioned.

7. Means for taking X-ray pictures comprising a curvilineal fluorescent screen against which an object to be X-rayed is positioned from the concave side thereof, a camera housing on the other side of said screen, light excluding means connecting said screen to said housing, a spherical mirror in said housing, an aplanatic lens mounted on said housing between said mirror and said fluorescent screen, a film box in said housing interposed between the lens and the mirror and having an open side facing the mirror, means in said film box for feeding film past the open side of said box facing the mirror, an X-ray opaque member mounted on said box at the opposite side thereof to exclude direct X-rays from the film.

8. Means for taking X-ray pictures comprising a fluorescent screen having a concave side against which an object to be X-rayed is positioned, an aspherical lens and spherical mirror system, film support means, said film support means and said lens mirror system being so positioned relative to each other and to said screen that the fluorescent image of the object positioned on the concave side of the screen is reproduced on the surface of the film support means, said film support means including a supporting surface flat in one direction of cross section for holding the film flat in said direction within the area within which an image is produced by said lens mirror system on the surface of said support means.

LEROY M. E. CLAUSING.

REFERENCES CITED

The following references are of record in the file of this patent:

UNITED STATES PATENTS

| Number | Name | Date |
|---|---|---|
| 1,431,271 | Van Allen | Oct. 10, 1922 |
| 2,248,976 | Files | July 15, 1941 |
| 2,273,801 | Landis | Feb. 17, 1942 |
| 2,419,478 | Bouwers | Apr. 22, 1947 |